Patented May 3, 1932

1,856,711

UNITED STATES PATENT OFFICE

GEORG KRÄNZLEIN AND HEINRICH GREUNE, OF FRANKFORT-ON-THE-MAIN-HOCHST, AND GERHARD LANGBEIN, OF HOFHEIM-IN-TAUNUS, GERMANY, ASSIGNORS TO GENERAL ANILINE WORKS, INC., OF NEW YORK, N. Y., A CORPORATION OF DELAWARE

BENZANTHRONE-DERIVATIVES AND PROCESS OF PREPARING THEM

No Drawing. Application filed December 23, 1930, Serial No. 504,420, and in Germany February 11, 1929.

The present invention relates to benzanthrone-derivatives and a process of preparing them.

We have found that new compounds having no dyestuff character are obtainable by condensing benzanthrone-peri-dicarboxylic acid anhydride or a derivative or a substitution product thereof with an aromatic ortho-diamine by heating the components in the presence of an indifferent solvent or diluent as, for instance, water, alcohol, nitrobenzene or the like at a temperature below about 80° C. The compounds thus obtainable have the probable general formula:

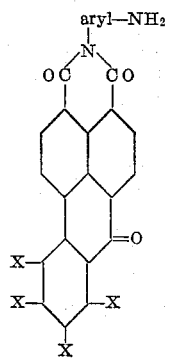

wherein X represents hydrogen or a substituent or two adjacent X's represent the grouping —CH=CH—CH=CH— and wherein the aryl—NH$_2$ group is linked to the nitrogen of the benzanthrone molecule in ortho position to the NH$_2$ group, being yellow to brown products which are insoluble in alkali and capable of being reduced to a vat at low temperature by means of hydrosulfite and alkali without being transformed into a dyestuff.

The said compounds may be converted, by further heating them either alone or in the presence of a solvent or a diluent of higher boiling point to a higher temperature— whereby water is split off—into such dyestuffs as are described in the U. S. application Serial No. 342,662 filed February 25, 1929, in the name of Georg Kränzlein, Heinrich Greune, Martin Corell and Heinrich Vollmann.

The temperature to be applied in the second phase of our process naturally exceeds 80° C.; it preferably, however, must not be so high that decomposition of the dyestuffs takes place. It is most advantageous to use temperatures between about 100° C. and about 300° C.

Instead of the benzanthrone-peri-dicarboxylic acid anhydrides there may be used with the same result their corresponding di-carboxylic acids.

It is advantageous for the formation of the dyestuff in the second stage to add to the reaction mixture a water-binding agent, such, for instance, as anhydrous sodium acetate or acetic acid anhydride.

The reaction, for instance, takes the following course:

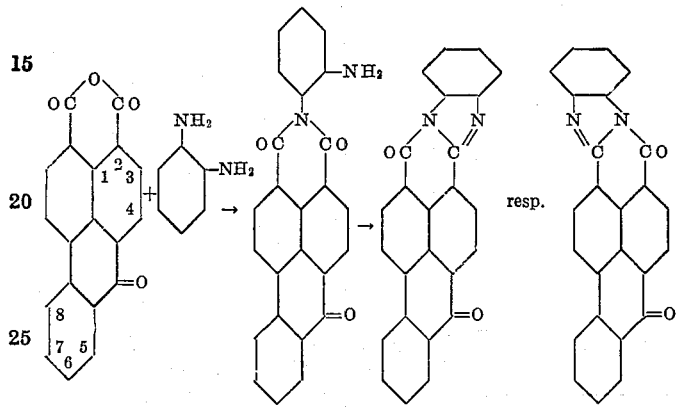

The following examples illustrate the invention, but they are not intended to limit it thereto, the parts being by weight:

(1) 30 parts of benzanthrone-peri-dicarboxylic acid anhydride, 11 parts of ortho-phenylene diamine, 5 parts of anhydrous sodium acetate and 150 parts of alcohol are heated to boiling for several hours on the reflux apparatus. The product thus obtained is filtered by suction and washed with hot alcohol, until the filtrate running 'down is colorless. The mass remaining on the filter is extracted by boiling several times with dilute caustic soda solution and washed until neutral.

The yellowish-brown product thus obtained is transformed by heating to a temperature exceeding 200° C.—whereby water is split off and the product turns red—into a dyestuff which dissolves in sulfuric acid to a violet-red solution and which dyes cotton from an alkaline hydrosulfite vat after exposure to the air orange tints of good fastness properties.

The same dyestuff may also be obtained by heating the intermediate product for some time on the reflux apparatus with glacial acetic acid, suitably while adding a small quantity of anhydrous sodium acetate. It is an orange product which dissolves in concentrated sulfuric acid to a violet-red solution and dyes cotton from an alkaline hydrosulfite vat orange tints of good fastness properties.

(2) 30 parts of benzanthrone-peri-dicarboxylic acid anhydride, 13 parts of 2.3-diaminotoluene and 150 parts of alcohol are boiled for several hours on the reflux apparatus and the whole is worked up as described in Example 1.

The yellowish-brown product thus obtained is converted by heating either alone or in the presence of glacial acetic acid or nitrobenzene, into a red dyestuff which is identical with that obtained according to Example 7 of U. S. application Serial No. 342,662 filed February 25, 1929, in the name of Georg Kränzlein, Heinrich Greune, Martin Corell and Heinrich Vollmann. It dissolves in concentrated sulfuric acid to a violet solution; it dies the vegetable fiber from the alkaline hydrosulfite vat fast scarlet tints.

(3) 30 parts of benzanthrone-peri-dicarboxylic acid anhydride, 14.5 parts of para-chloro-ortho-phenylene diamine and 150 parts of alcohol are boiled for several hours on the reflux apparatus. The product thus obtained is filtered by suction and worked up as described in Example 1. The light brown condensation product of the following probable formula:

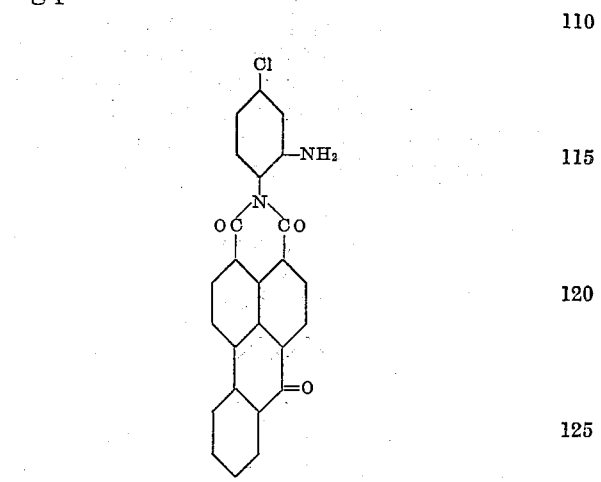

is heated with a higher boiling solvent whereby the ring is closed to the corresponding dyestuff which dyes cotton from a red vat bright orange tints of good fastness properties.

(4) 30 parts of benzanthrone-peri-dicarboxylic acid anhydride, 16 parts of 2-chloro-4.5-diaminotoluene and 150 parts of alcohol are heated to boiling for 6 hours on the reflux apparatus. The product thus obtained is filtered by suction, while hot, washed with alcohol and the mass remaining on the filter is extracted with hot dilute caustic soda solution in order to remove small quantities of the starting material.

The light-brown condensation product thus obtained is converted, by heating with glacial acetic acid nitro-benzene or the like, into the corresponding dyestuff which dyes cotton from a red vat intense orange tints.

(5) 30 parts of benzanthrone-peri-dicarboxylic acid anhydride, 16 parts of para-ethoxy-ortho-phenylene diamine and 150 parts of alcohol are boiled for several hours on the reflux apparatus. The working up is the same as that described in Example 1. There is obtained a dark brown condensation product which is converted by heating either alone or in the presence of a higher boiling solvent into the corresponding dyestuff. It dyes cotton from a red vat intense brown tints.

By using instead of the benzanthrone-peri-dicarboxylic acid anhydride 7-methyl-benzanthrone-peri-dicarboxylic acid anhydride there is obtained a dyestuff which is very similar to that above described.

(6) 35 parts of 5.6-benzbenzanthrone-peri-dicarboxylic acid anhydride (obtainable, for instance, by melting 4-α-naphthoylnaphthalic acid anhyride with aluminium chloride), 11 parts of o-phenylene diamine and 150 parts of alcohol are heated to boiling for several hours on the reflux apparatus. The intermediate product thus obtained is worked up as described in Example 1. It is easily converted by heating either alone or in the presence of glacial acetic acid or in any other high boiling solvent, into its corresponding dyestuff (cp. for instance Example 12 of U. S. application Serial No. 342,662 filed February 25, 1929, in the name of Georg Kränzlein, Heinrich Greune, Martin Corell and Heinrich Vollmann). It dyes cotton from an olive-green vat bluish red tints of good fastness properties.

(7) 35 parts of 7.8-benzbenzanthrone-peri-dicarboxylic acid anhydride (obtainable by melting 4-β-naphthoylnaphthalic acid anhydride with aluminium chloride), 11 parts of ortho-phenylene diamine, 5 parts of sodium acetate and 150 parts of alcohol are boiled for several hours on the reflux apparatus. The product thus obtained is filtered by suction and worked up as described in Example 1. The brown intermediate product which has the following probable formula:

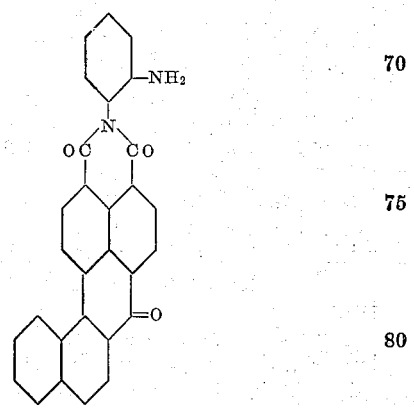

is converted by heating either alone or in the presence of a higher boiling solvent into a dyestuff which dyes cotton from an olive-green vat bluish-red tints of good fastness properties.

(8) 30 parts of benzanthrone-peri-dicarboxylic acid anhydride, 11 parts of orthophenylene diamine, 300 parts of benzene are heated to boiling for 10–20 hours. The product thus obtained is filtered by suction, while hot, washed with alcohol and extracted by means of dilute caustic soda solution. The light-yellow condensation product thus obtained is identical with that obtained according to Example 1. The yield is smaller than that obtained according to Example 1 owing to the small solubility of the benzanthrone-peri-dicarboxylic acid anhydride in benzene.

(9) 30 parts of benzanthrone-peri-dicarboxylic acid anhydride are heated with 300 parts of water and 20 parts of caustic soda solution of 40 per cent strength until there is a complete solution. The product thus obtained is neutralized by means of dilute hydrochloric acid whereby the benzanthrone-peri-dicarboxylic acid is precipitated in a finely subdivided form. 11 parts of orthophenylene diamine are added to this suspension and the whole is heated for several hours to 80° C. After having worked up the mixture in the described manner, there is obtained with a good yield the same condensation product as that obtained according to Example 1.

The condensation product is converted by heating in the presence of a higher boiling solvent into a dyestuff which is identical with that obtained according to Example 1.

(10) 33.5 parts of chloro-benzanthrone-peri-dicarboxylic acid anhydride (obtainable by melting while simultaneously chlorinating 4-benzoylnapthalic acid anhydride with aluminium-chloride), 11 parts of ortho-phenylene diamine and 150 parts of alcohol are boiled for several hours on the reflux apparatus. After filtering by suction and extracting by means of dilute caustic soda solution, there is obtained a light-brown product which is converted by heating either alone or in the presence of a higher boiling solvent into a red dyestuff yielding a red vat.

(11) 30 parts of benzanthrone-peri-dicarboxylic acid anhydride, 16 parts of 1.2-diaminonaphthalene and 150 parts of alcohol are heated to boiling for several hours. The working up is the same as that described in Example 1. The brown condensation product thus obtained is converted by heating it with a higher boiling solvent into a dyestuff which dyes cotton from a red vat brown tints.

By using instead of 1.2-diamino-naphthalene 4.5-diamino-acenaphthene, there is obtained a dyestuff dyeing covered brown tints.

(12) 30 parts of benzanthrone-peri-dicarboxylic acid anhydride, 10.5 parts of o.o'-diamino-benzidine, 5 parts of anhydrous sodium acetate and 150 parts of alcohol are heated to boiling for 10 hours on the reflux apparatus. The whole is then filtered by suction and worked up as described in Example 1. The condensation product thus obtained which has the following probable formula:

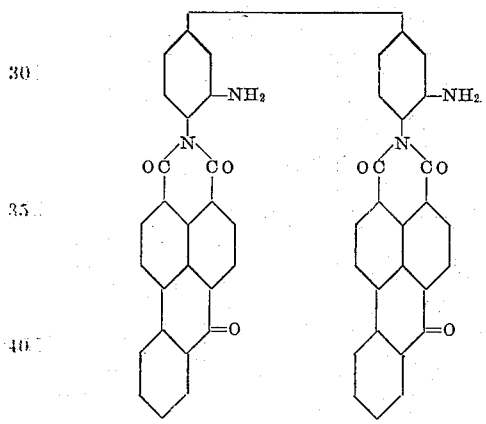

is converted by heating it with a higher boiling solvent into a dyestuff which dyes cotton from a red vat intense, violet-brown tints of good fastness properties.

We claim:

1. The process which comprises condensing benzanthrone-peri-dicarboxylic acid anhydride with p-chloro-o-phenylene diamine by heating the components for some hours in the presence of alcohol at boiling temperature and further heating the condensation product thus obtained in the presence of an indifferent diluent of higher boiling point to a temperature exceeding 80° C.

2. The process which comprises condensing 7.8-benzbenzanthrone-peri-dicarboxylic acid anhydride with o-phenylene diamine by heating the components for some hours in the presence of alcohol at boiling temperature and further heating the condensation product thus obtained in the presence of an indifferent diluent of higher boiling point to a temperature exceeding 80° C.

3. The process which comprises condensing benzanthrone-peri-dicarboxylic acid anhydride with o.o'-diaminobenzidine by heating the components for some hours in the presence of alcohol at boiling temperature and further heating the condensation product thus obtained in the presence of an indifferent diluent of higher boiling point to a temperature exceeding 80° C.

4. As a new product, the compound of the following probable formula:

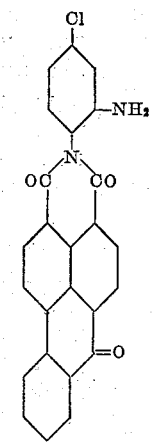

being a brown product, having no dyestuff character, which is insoluble in alkali and capable of being reduced to a vat at low temperature by means of hydrosulfite and alkali without being transformed into a dyestuff, and which is converted, by heating either alone or in the presence of an indifferent solvent to a temperature exceeding 80° C. with splitting off of water, into a vat dyestuff.

5. As a new product, the compound of the following probable formula:

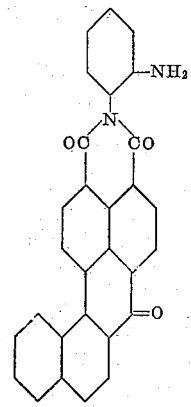

being a brown product, having no dyestuff character, which is insoluble in alkali and capable of being reduced to a vat at low temperature by means of hydrosulfite and alkali without being transformed into a dyestuff, and which is converted, by heating either alone or in the presence of an indifferent solvent to a temperature exceeding 80° C. with splitting off of water, into a vat dyestuff.

6. As a new product, the compound of the following probable formula:

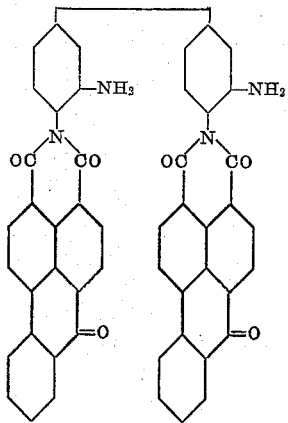

being a brown product, having no dyestuff character, which is insoluble in alkali and capable of being reduced to a vat at low temperature by means of hydrosulfite and alkali without being transformed into a dyestuff, and which is converted, by heating either alone or in the presence of an indifferent solvent to a temperature exceeding 80° C. with splitting off of water, into a vat dyestuff.

7. The process which comprises condensing a benzanthrone-peri-dicarboxylic acid anhydride compound with an aromatic ortho-diamine by heating the components in the presence of an indifferent diluent at a temperature below about 80° C. and further heating the condensation product thus obtained to a temperature exceeding about 80° C.

8. The process which comprises condensing a benzanthrone-peri-dicarboxylic acid anhydride compound with an aromatic ortho-diamine by heating the components in the presence of an indifferent diluent at a temperature below about 80° C. and further heating the condensation product thus obtained in the presence of an indifferent diluent to a temperature exceeding about 80° C.

9. The process which comprises condensing a compound of the following formula:

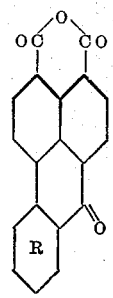

wherein the mucleus R may be substituted by halogen or alkyl or may be linked to the chain —CH=CH—CH=CH— to form a further condensed six-membered ring, with an aromatic ortho-diamine by heating the components in the presence of an indifferent diluent at a temperature below about 80° C. and further heating the condensation product thus obtained to a temperature exceeding about 80° C.

10. The process which comprises condensing a compound of the following formula:

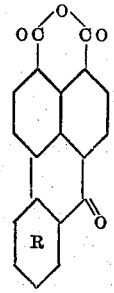

wherein the nucleus R may be substituted by halogen or alkyl or may be linked to the chain —CH=CH—CH=CH— to form a further condensed six-membered ring, with an aromatic ortho-diamine by heating the components in the presence of an indifferent diluent at a temperature below about 80° C. and further heating the condensation product thus obtained in the presence of an indifferent diluent to a temperature exceeding about 80° C.

11. The process which comprises condensing a compound of the following formula:

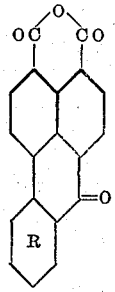

wherein the nucleus R may be substituted by halogen or alkyl or may be linked to the chain —CH=CH—CH=CH— to form a further condensed six-membered ring, with an aromatic ortho-diamine of the benzene series by heating the components in the presence of an indifferent diluent at a temperature below about 80° C. and further heating the condensation product thus obtained to a temperature exceeding about 80° C.

12. The process which comprises condensing a compound of the following formula:

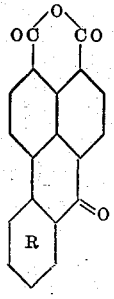

wherein the nucleus R may be substituted by halogen or alkyl or may be linked to the chain —CH=CH—CH=CH— to form a further condensed six-membered ring, with an aromatic ortho-diamine of the benzene series by heating the components in the presence of an indifferent diluent at a temperature below 80° C. and further heating the condensation product thus obtained in the presence of an indifferent diluent to a temperature exceeding about 80° C.

13. The process which comprises condensing a compound of the following formula:

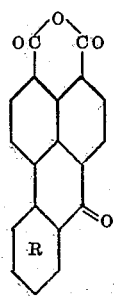

wherein the nucleus R may be substituted by chlorine or methyl or may be linked to the chain —CH=CH—CH=CH— to form a further condensed six-membered ring, with an aromatic ortho-diamine of the benzene series by heating the components in the presence of an indifferent diluent at a temperature below about 80° C. and further heating the condensation product thus obtained to a temperature exceeding about 80° C.

14. The process which comprises condensing a compound of the following formula:

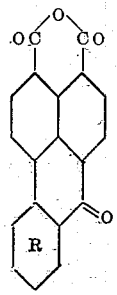

wherein the nucleus R may be substituted by chlorine or methyl or may be linked to the chain —CH=CH—CH=CH— to form a further condensed six-membered ring, with an aromatic ortho-diamine of the benzene series by heating the components in the presence of an indifferent diluent at a temperature below about 80° C. and further heating the condensation product thus obtained in the presence of an indifferent diluent to a temperature exceeding about 80° C.

15. As new products the compounds of the probable general formula:

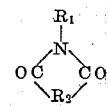

wherein $R_1$ stands for a radicle of an aromatic amine attached to the N-atom in a position ortho to the $NH_2$ group and wherein $R_2$ is a radicle of a peri-benzanthronyl type, being yellow to brown products, having no dyestuff character, which are insoluble in alkali and capable of being reduced to a vat at low temperature by means of hydrosulfite and alkali without being transformed into a dyestuff, and which are converted, by heating either alone or in the presence of an indifferent solvent to a temperature exceeding 80° C. with splitting off of water, into a vat dyestuff.

16. As new products, the compounds of the probable general formula:

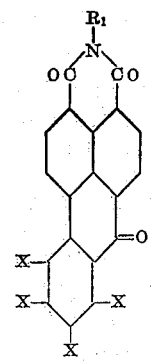

wherein $R_1$ stands for a radicle of an aromatic amine attached to the N-atom in a position ortho to the $NH_2$ group and wherein X represents alkyl or halogen or two adjacent X's together represent the grouping —CH=CH—CH=CH—, being yellow to brown products, having no dyestuff character, which are insoluble in alkail and capable of being reduced to a vat at low temperature by means of hydrosulfite and alkali without being transformed into a dyestuff, and which are converted, by heating either alone or in the presence of an indifferent solvent to a temperature exceeding 80° C. with splitting off of water, into a vat dyestuff.

17. As new products, the compounds of the probable general formula:

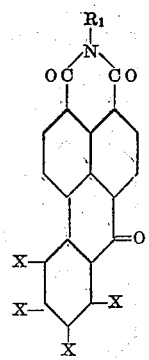

wherein $R_1$ stands for a radicle of an aromatic amine attached to the N-atom in a position ortho to the $NH_2$ group and wherein X represents methyl or chlorine or two adjacent X's together represent the grouping —CH=CH—CH=CH—, being yellow to brown products, having no dyestuff character, which are insoluble in alkali and capable of being reduced to a vat at low temperature by means of hydrosulfite and alkali without being transformed into a dyestuff, and which are converted, by heating either alone or in the presence of an indifferent solvent to a temperature exceeding 80° C. with splitting off of water, into a vat dyestuff.

18. As new products, the compounds of the probable general formula:

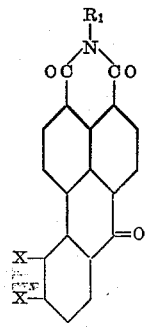

wherein $R_1$ stands for a radicle of an aromatic amine attached to the N-atom in a position ortho to the $NH_2$ group and X represents hydrogen or the two X's together represent the grouping —CH=CH—CH=CH—, being yellow to brown products, having no dyestuff character, which are insoluble in alkali and capable of being reduced to a vat at low temperature by means of hydrosulfite and alkali without being transformed into the dyestuff, and which are converted, by heating either alone or in the presence of an indifferent solvent to a temperature exceeding 80° C. with splitting off of water, into a vat dyestuff.

19. As new products, the compounds of the probable general formula:

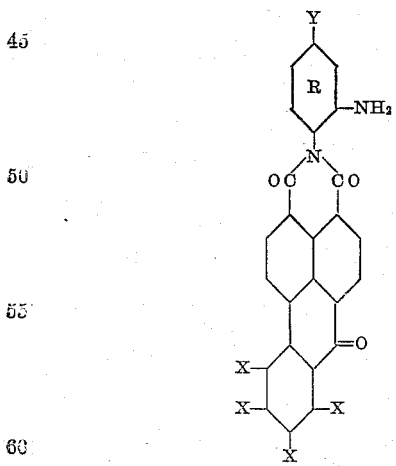

wherein X represents hydrogen, halogen or alkyl or two adjacent X's together represent the grouping —CH=CH—CH=CH— and wherein the nucleus marked R may be substituted by alkyl, alkoxy and halogen, and Y may stand for hydrogen or the radicle:

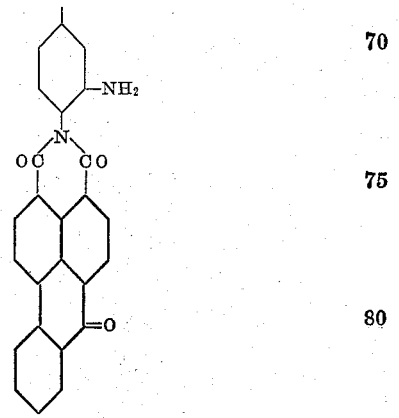

being yellow to brown products, having no dyestuff character, which are insoluble in alkali and capable of being reduced to a vat at low temperature by means of hydrosulfite and alkali without being transformed into the dyestuff, and which are converted, by heating either alone or in the presence of an indifferent solvent to a temperature exceeding 80° C. with splitting off of water, into a vat dyestuff.

20. As new products the compounds of the probable general formula:

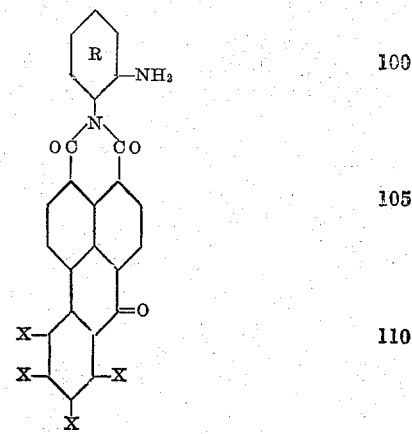

wherein X represents hydrogen, halogen or alkyl or two adjacent X's together represent the grouping —CH=CH—CH=CH— and wherein the nucleus marked R may be substituted by alkyl, alkoxy and halogen, being yellow to brown products, having no dyestuff character, which are insoluble in alkali and capable of being reduced to a vat at low temperature by means of hydrosulfite and alkali without being transformed into the dyestuff, and which are converted, by heating either alone or in the presence of an indifferent solvent to a temperature exceeding 80° C. with splitting off of water, into a vat dyestuff.

21. As new products the compounds of the probable general formula:

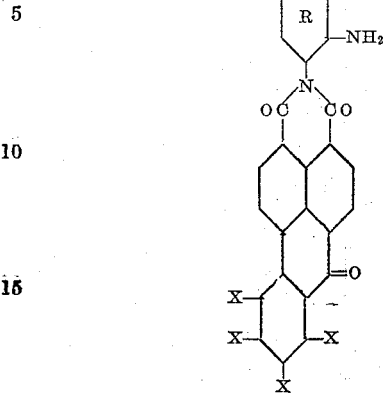

wherein X represents hydrogen, chlorine or methyl or two adjacent X's together represent the grouping —CH=CH—CH=CH— and wherein the nucleus marked R may be substituted by methyl, methoxy and halogen, being yellow to brown products, having no dyestuff character, which are insoluble in alkali and capable of being reduced to a vat at low temperature by means of hydrosulfite and alkali without being transformed into the dyestuff, and which are converted, by heating either alone or in the presence of an indifferent solvent to a temperature exceeding 80° C. with splitting off of water, into a vat dyestuff.

22. As new products, the compounds of the probable general formula:

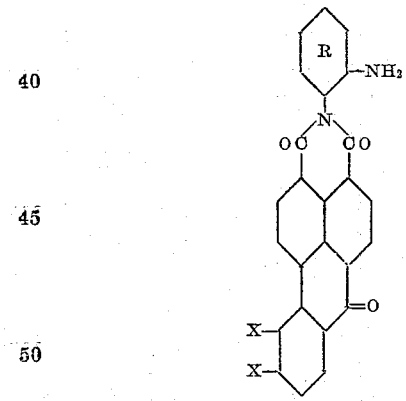

wherein X represents hydrogen or the two X's together represent the grouping —CH=CH—CH=CH— and wherein the nucleus marked R may be substituted by methyl, methoxy and chlorine, being yellow to brown products, having no dyestuff character, which are insoluble in alkali and capable of being reduced to a vat at low temperature by means of hydrosulfite and alkali without being transformed into a dyestuff, and which are converted, by heating either alone or in the presence of an indifferent solvent to a temperature exceeding 80° C. with splitting off of water, into a vat dyestuff.

In testimony whereof we affix our signatures.

GEORG KRÄNZLEIN.
HEINRICH GREUNE.
GERHARD LANGBEIN.